(12) United States Patent
Austin

(10) Patent No.: US 6,236,855 B1
(45) Date of Patent: May 22, 2001

(54) METHOD FOR VOICE QUALITY IMPROVEMENT IN A WIRELESS TRANSMISSION SYSTEM

(75) Inventor: Mark David Austin, Atlanta, GA (US)

(73) Assignee: Bellsouth Intellectual Property Management Corporation, Atlanta, GA (US)

( * ) Notice: Subject to any disclaimer, the term of this patent is extended or adjusted under 35 U.S.C. 154(b) by 0 days.

(21) Appl. No.: 08/847,064

(22) Filed: May 1, 1997

(51) Int. Cl.[7] ...................................................... H04Q 7/38
(52) U.S. Cl. .............................................. 455/423; 455/63
(58) Field of Search ................................... 455/450, 423, 455/453, 62, 63, 513; 370/337, 347, 321; 371/37.1, 37.2, 37.3, 37.4, 37.6, 37.7; 348/473

(56) References Cited

U.S. PATENT DOCUMENTS

| | | |
|---|---|---|
| 4,495,619 | 1/1985 | Acampora . |
| 5,230,082 | * 7/1993 | Ghisler et al. ..................... 455/450 |
| 5,276,686 | * 1/1994 | Ito ...................................... 455/450 |
| 5,282,019 | * 1/1994 | Basile et al. ...................... 348/473 |
| 5,697,056 | * 12/1997 | Tayloe ............................. 455/67.3 |
| 5,737,359 | * 4/1998 | Koivu ............................... 455/67.3 |
| 5,751,767 | * 5/1998 | Tatsumi ........................... 455/67.3 |

FOREIGN PATENT DOCUMENTS

| | | |
|---|---|---|
| 0 333 679 | 9/1989 | (EP) . |
| WO 97/13388 | 4/1997 | (WO) . |

OTHER PUBLICATIONS

TIA Standard IS–136.2–A.

* cited by examiner

Primary Examiner—Salvatore Cangialosi
(74) Attorney, Agent, or Firm—Kilpatrick Stockton LLP

(57) ABSTRACT

A method for enhancing the voice signal received by a remote user in a time division multiple access (TDMA), cellular telephone system. In order to enhance the signal received by a remote user in a TDMA cellular telephone system, the base station transmits to the remote user in need of signal improvement additional signal enhancing data on one or more previously idle transmission resources. The method includes identifying the first remote user in need of signal enhancing data, identifying and selecting an idle transmission resource, identifying for the first remote user the selected transmission resource, generating additional signal enhancing data, and inserting the additional signal enhancing data into the selected transmission resource for transmission to the first remote user. If the selected transmission resource is required to provide primary service to a second remote user, the selected resource will be reassigned to the second requesting user, and the transmission of additional signal enhancing data to the first remote user will be terminated.

23 Claims, 3 Drawing Sheets

METHOD FOR VOICE QUALITY IMPROVEMENT IN A WIRELESS TRANSMISSION SYSTEM

TECHNICAL FIELD

The present invention relates generally to a time division multiple access (TDMA) cellular telephone system and more particularly to improving the voice quality transmission in a TDMA cellular telephone system by utilizing idle transmission resources to transmit signal enhancing data to a remote user or from a remote user.

BACKGROUND OF THE INVENTION

In a time division multiple access (TDMA) cellular telephone system, an analog voice signal is delivered to the base station of a cell for transmission to a remote user or mobile station in the cell by means of a radio frequency (RF) downlink signal. At the base station, the analog voice signal is first digitized. The digitized voice signal is next compressed using known voice compression techniques. In order to preserve the quality of the signal during transmission to the mobile station, forward error protection data is added to the compressed voice signal. Forward error protection is a known signal processing technique that allows the mobile station to recover valid data in the presence of transmission errors. The compressed voice signal with forward error protection data is then multiplexed with other compressed voice signals having forward error protection data and transmitted as an RF signal to the mobile stations within the cell serviced by the base station. The transmitted compressed voice signal with forward error protection data is received by the mobile station, decompressed, and converted to an analog signal to recover the original voice signal. In the same fashion, the mobile station may also digitize, compress, add forward error protection, and transmit the compressed voice signal with forward error protection back to the base station.

The voice signal compression or encoding process at the base station is done using known voice encoders (vocoders) 15 and data compression techniques. Likewise, the decompression process at the mobile station or remote user is done using known decoders and known decompression techniques. The voice signal is compressed and decompressed in order to conserve bandwidth within the RF transmission spectrum. Adding forward error protection data to the compressed voice signal requires additional bandwidth.

The amount of signal compression of the vocoder is quantified by the ratio of the input data rate of the digitized voice signal to the output data rate for the compressed voice signal. For instance, if the digitized voice signal input to the vocoder is 64 kilobits per second (kbps) and if the output from the vocoder is 8 kbps, then the vocoder has compressed the voice signal 8 times and has an 8:1 compression ratio. The capacity of a digital TDMA cellular telephone system is determined by the bit rate needed for each mobile station to communicate versus the total bit rate that the base station can support. For example, if each mobile station needs 10 kbps of bandwidth and if the base station can support 100 kbps of band width, then the base station can support 10 mobile stations.

In a TDMA cellular telephone system (such as specified by TIA Standard IS-136, which is incorporated herein by reference), the RF transmission spectrum is divided up into smaller portions of spectrum, called channels, which in turn are then time shared by a number of mobile stations. For instance, TIA Standard IS-136 defines a base station for a TDMA cellular telephone system which has a set of RF channels, each 30 kilohertz (kHz) in bandwidth. Each RF channel is time divided into frames, and each frame is divided into 6 equally spaced time slots as shown in FIG. 3. The length of each frame is 40 milliseconds or 1944 bits or 972 symbols. The length of each time slot is 6.67 milliseconds or 324 bits or 162 symbols.

The mobile stations served by a single 30 kHz RF channel are assigned different time slots so that the mobile stations can share the RF channel by communicating (transmitting or receiving a voice signal) only within the prescribed time slots of the RF channel. TIA Standard IS-136 defines two types of voice transmission, half rate in which each mobile station only uses one time slot out of the 6 per frame and full rate in which each mobile station uses two time slots out of 6 per frame. Therefore, the number of voice channels that are available for each 30 kHz RF channel is 6 for half rate and 3 for full rate operation.

The quality of the voice signal received by a mobile station is dependent on the degree of signal compression, the amount of forward error protection data transmitted, and the strength of the RF signal at the mobile station's location. Generally, vocoders that compress speech to a lower bit rate (higher compression ratio) will have a lower voice quality than vocoders with a higher bit rate output (lower compression ratio). Also, the quality of the signal received by the mobile station is improved by transmitting more forward error protection data with the compressed voice signal. Both high bit rate and added forward error protection data require additional transmission bandwidth. Therefore, there is a direct tradeoff between the voice quality that a mobile station will experience versus the capacity of the base station.

The quality of the voice signal received by a mobile station is also effected by the strength of the RF signal at the mobile station's location. As the mobile stations move away from the base station, the strength of the RF signal diminishes, and the quality of the voice transmission may deteriorate as a result.

SUMMARY OF THE INVENTION

In order to improve the voice quality of the data or voice signal received by a mobile station (or returned to the base station) that may be experiencing voice quality deterioration, the present invention provides a method for utilizing idle transmission resources of the base station to transmit additional signal enhancing data to the mobile station and to receive additional signal enhancing data from the mobile station. Because the voice quality of a call is proportional to the bit rate sent to the mobile station, increasing the bit rate of the transmission will improve the quality of the voice signal at the mobile station location. The increased bit rate may be accomplished by decreasing the compression ratio of the vocoder (increased sound fidelity), by increasing the amount of forward error protection data sent (reduced transmission losses), or by a combination of both techniques. In the preferred embodiment of the present invention, voice quality improvement is achieved by increasing the amount of forward error protection data sent to the mobile station.

In order to send additional signal enhancing data to the mobile station requiring voice quality improvement, the present invention identifies and selects idle transmission resources on which to send the additional signal enhancing data. Because the serving base station has knowledge of the number of calls that are carried at any moment, the idle time slots within the frames of the RF channels are known. Additionally, since cellular operators typically engineer their cell sites with enough RF channels so that blocking (i.e. a request for a channel is denied due to all channels in use) only occurs 2% of the time, there is a high probability that idle channels (time slots) will exist. Indeed, at 2% blocking with 19 channels a given channel is only utilized 62.9% of the time assuming Erlang-B blocked calls cleared. This fact has been exploited in other inventions, such as cellular digital packet data (CDPD) to find resources for sending quick bursts of data over idle analog channels (i.e. on an analog AMPs cellular system). This invention uses the idle channels, in this case time slots, to improve voice quality.

Particularly, the preferred method of the present invention uses adjacent idle time slots of the base station for transmitting the additional signal enhancing data (additional compressed voice data or additional forward error protection data) to improve voice quality for a mobile station on the downlink that is experiencing voice quality deterioration. The adjacent idle time slots are on the same frequency as the time slots carrying the compressed voice signal, and the adjacent idle time slots are adjacent to, and temporally after, the time slots carrying the compressed voice signal. If, for example in FIG. 3, the time slots 1 and 4 are being used to carry the compressed voice signal, the adjacent idle time slots for carrying signal enhancing data are time slots 2 and 5 respectively.

Alternatively, the idle transmission resource of the present method may use non-adjacent idle time slots transmitted from the same base station or idle time slots transmitted from an adjacent base station when the mobile station is near the cell boundary between two base stations. Another alternative idle transmission resource may consist of a portion of an idle analog channel transmitted from the base station or an adjacent base station. Although the preferred embodiment is disclosed with respect to the downlink, the method of the present invention may also have application to the uplink (mobile station to base station). The uplink application of the present invention would require extra transmission time from the mobile station which will decrease battery life in portable remote units.

Once an idle transmission resource has been identified and selected for transmitting signal enhancing data, the base station in the preferred embodiment of the present invention communicates the identity of the idle transmission resource to the mobile station. Particularly, base station identifies to the mobile station that certain time slots within a frame should be received and decoded by the mobile station. In another embodiment of the present invention, the mobile station continuously searches among transmission resources to find signal enhancing data.

In order to determine which mobile station or remote users require signal enhancing data, the base station monitors the signal quality transmitted to the mobile units. For example, the quality of the transmitted signal may be determined by monitoring the bit error rates (BER) reported by the various mobile stations, by monitoring the signal strengths from the mobile stations within the cell, by monitoring the carrier to interference ratio, or by monitoring a combination of those parameters. Threshold values may then be set for the signal quality which threshold values will trigger the method of the present invention to send additional signal enhancing data to one or more mobile stations via otherwise idle transmission resources.

In accordance with the preferred embodiment of the present invention, the method will give up use of the selected transmission resource and stop sending signal enhancing data to a first mobile station in response to a request for service by a caller to a second mobile station or a request for service from a second mobile station which requires the selected transmission resource. The first mobile station may be notified by the base station that it should stop receiving and decoding the previously selected transmission resource. Alternatively, the first mobile station may give up use of the selected transmission resource upon receipt of data via that resource that is coded for the second mobile station instead of the first mobile station.

DETAILED DESCRIPTION OF THE PREFERRED EMBODIMENT

The environment for the preferred embodiment of the present invention is a time division multiple access (TDMA) cellular telephone system constructed and operated in accordance with TIA Standard IS-136 which is well know to those of ordinary skill in the art. TIA Standard IS-136 is incorporated herein by reference. Turning to the drawings in which like numbers reference like parts or steps, in the several figures, FIG. 1 of this specification is a schematic diagram of two adjacent cells of a TDMA cellular telephone system 10 which constitutes the environment for the preferred embodiment of the present invention. In connection with the following description of the preferred embodiment, the focus will be on voice quality enhancement on the downlink portion of the TDMA cellular telephone system. The principles of the invention have equal applicability to the uplink portion of the TDMA cellular telephone system.

Figure 1:
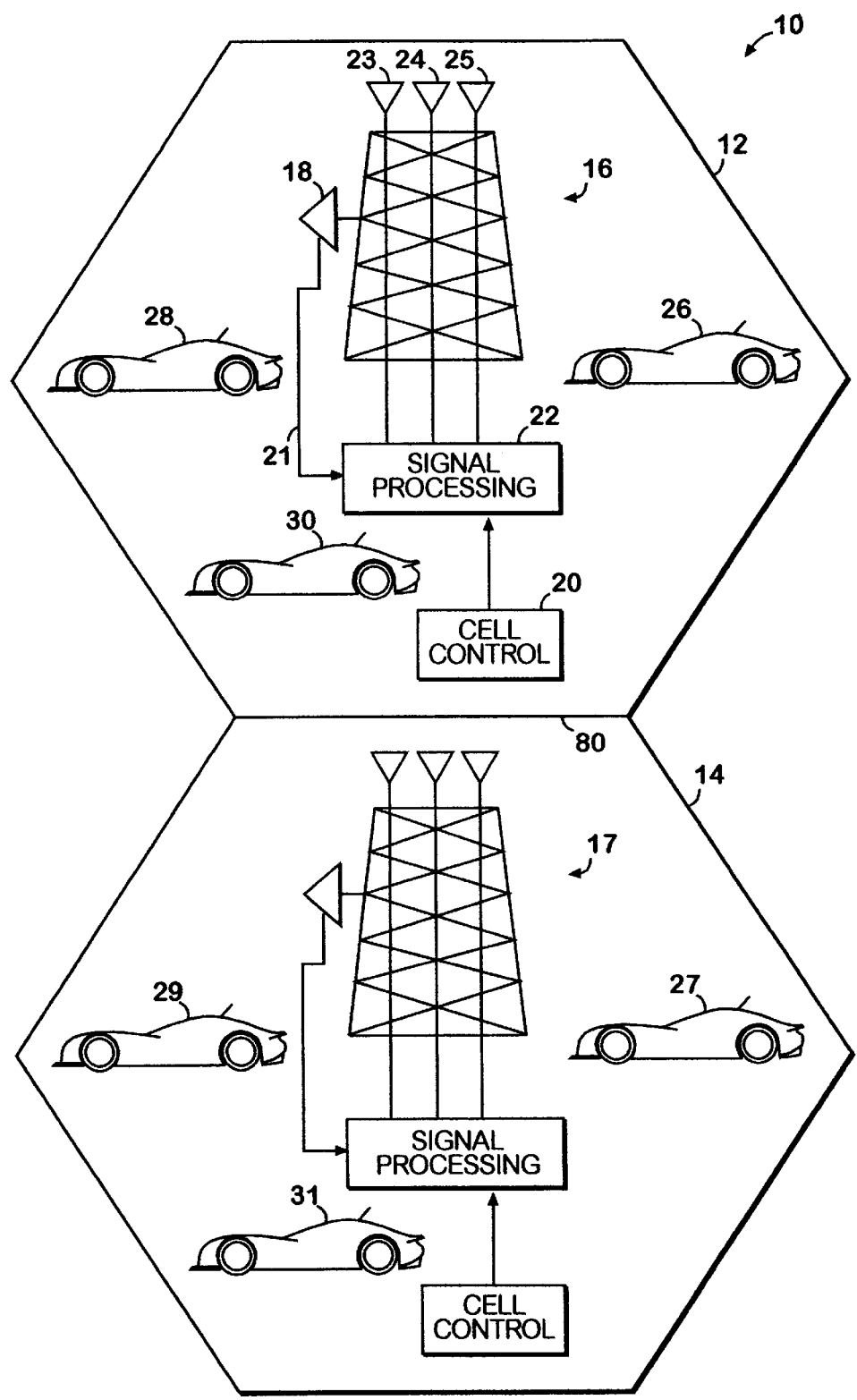
FIG. 1 is a schematic diagram of two adjacent cells of a time division multiple access (TDMA) cellular telephone system which constitutes a portion of the environment for the preferred embodiment of the present invention.

The TDMA cellular telephone system 10 comprises a number of cells, such as cells 12 and 14, shown for purposes of illustration in FIG. 1. Each cell includes a base station such as base station 16 of cell 12 and base station 17 of cell 14. Within each cell are a number of remote users or mobile stations, such as mobile stations 26, 28, and 30 in cell 12 and mobile stations 27, 29, and 31 in cell 14. By the very nature of the mobile stations, they are able to move within the cell and from cell to cell.

The base station 16 in cell 12 includes receiving antennas 23 and 25, cell control circuit 20, signal processing circuit 22, and transmission antenna 24. The base station 17 in cell 14 is similarly configured.

In connection with the operation of cell 12 of the TDMA cellular telephone system 10, analog voice signals or other data are received from a local telephone company switching system via antenna 18. Alternatively, analog telephones signals or other data could be delivered to the cell 12 by means of conventional telephone lines. The analog voice signals or other data received on antenna 18 are connected to signal processing circuit 22 via lines 21. In the digital TDMA cellular telephone system 10, analog telephone signals are digitized, compressed, and multiplexed in the signal processing circuit 22, and then transmitted via antenna 24 to mobile stations 26, 28, and 30 within the cell 12.

Figure 2:
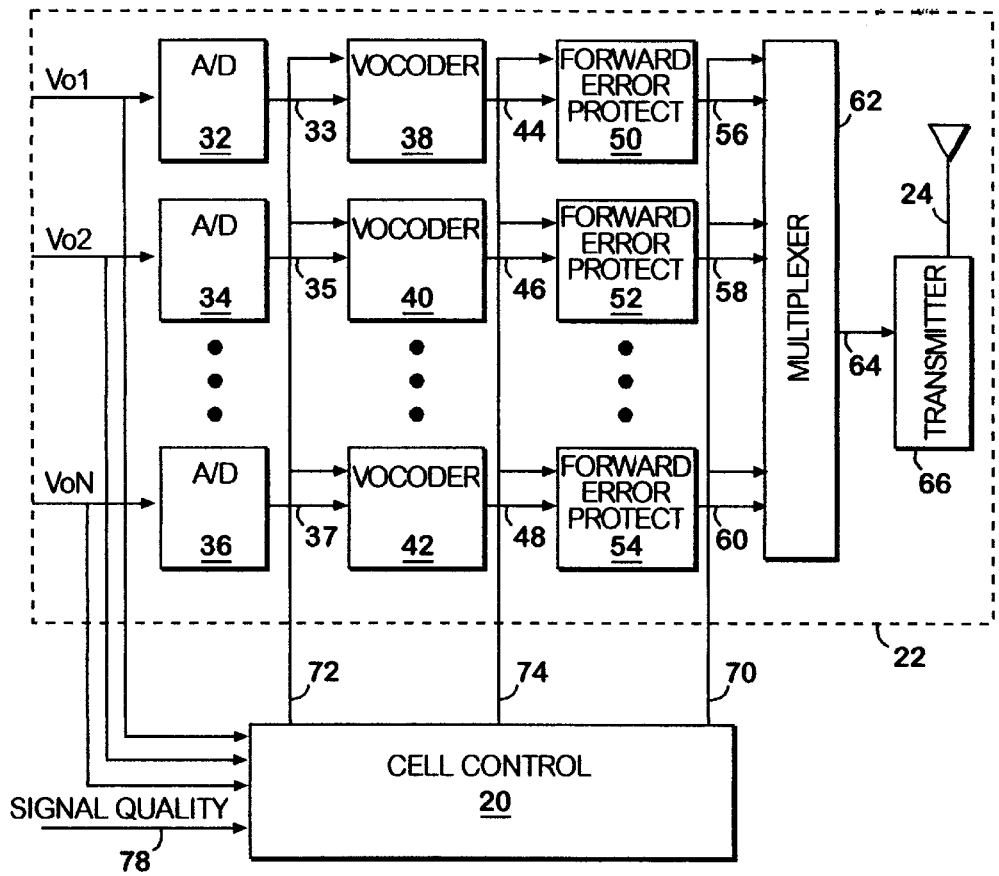
FIG. 2 is a high level block diagram of the signal processing circuit and cell control circuit.

Turning to FIG. 2, there is shown cell control circuit 20 and the signal processing circuit 22 of the base station 16. The signal processing circuit 22 has analog voice (or data) inputs Vo1, Vo2, and VoN. For each 30 kHz RF channel, N=3 for full rate service and N=6 for half rate service. In the TDMA cellular telephone system 10, each of the analog voice signals Vo1, Vo2, and VoN is connected to an analog to digital (A/D) converter, such as A/D converters 32, 34, and 36 shown in FIG. 2. A/D converters 32, 34, and 36 convert the analog signals Vo1, Vo2, and VoN to digital signals in conventional fashion and produce corresponding digital voice signals on lines 33, 35, and 37. The digital voice signals on lines 33, 35, and 37 have bit rates of generally 64 kilobits per second (kbps). The 64 kbps digital voice signals from the A/D converters 32, 34, and 36 are connected to corresponding voice encoders (vocoders) 38, 40, and 42 shown in FIG. 2. The vocoders 38, 40, and 42 compress the digital voice signals on lines 33, 35, and 37 to produce compressed voice signals on lines 44, 46, and 48. The vocoders compress the digital voice signal from bit rates of about 64 kbps to bit rates of 8 kbps. The vocoders therefore have a compression ratio of 8:1.

The compressed voice signals on lines 44, 46, and 48 are connected to forward error protection circuits 50, 52, and 54 respectively. The forward error protection circuits 50, 52, and 54 add forward error protection data to the compressed voice signals. In the environment of the TDMA cellular telephone system 10, the forward error protection circuits 50, 52, and 54 add an additional 5 kbps of data to the compressed voice signals on lines 56, 58, and 60. Consequently, compressed voice signals on lines 56, 58, and 60 have bit rates of about 13 kbps. The compressed voice signals on lines 56, 58, and 60 are connected to multiplexer 62 which multiplexes the compressed voice signals having forward error protection data and connects them via line 64 to the RF transmitter 66. The RF transmitter 66 then transmits the multiplexed, compressed voice signals to the mobile stations 26, 28, and 30 within cell 12 (FIG. 1).

Figure 3:
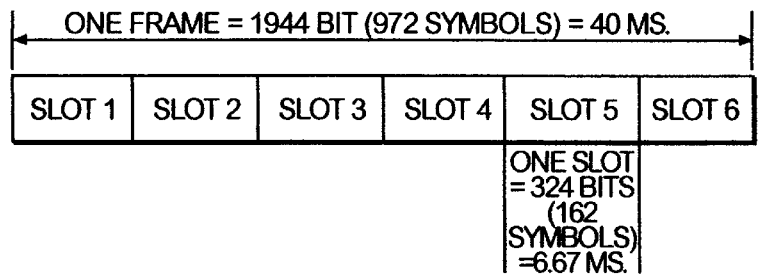
FIG. 3 is a chart showing the relationship of a frame and time slots for a single 30 kHz RF channel.

Turning to FIG. 3 there is shown, the frame format for the multiplexed signal on line 64 of the TDMA cellular telephone system 10. As previously stated, each base station, such as base station 16, has assigned to it a preselected number of 30 kHz RF channels for transmission and receipt of compressed voice signals to and from the mobile stations 26, 28, and 30. In order to service a number of mobile stations, each 30 kHz RF channel is timed divided into frames such as that shown in FIG. 3. The length of each frame is 40 milliseconds (ms) or 1944 bits or 972 symbols. As shown in FIG. 3, each frame is divided into 6 equal time slots numbered 1 through 6. The length of each time slot is 6.67 ms or 324 bits or 162 symbols.

Each 30 kHz RF channel of the TDMA cellular telephone system 10 can service 3 mobile stations at full rate and 6 mobile stations at half rate. At full rate two time slots in each frame are received and decoded by each mobile station. At half rate one time slot in each frame is received and decoded by each mobile station. The following discussion will assume that the TDMA cellular telephone system 10 is operating as a full rate system so that each 30 kHz RF channel can service a maximum of 3 mobile stations by using two time slots per mobile station. For example, mobile station 26 will receive its compressed voice signal in time slots 1 and 4, mobile station 28 will receive its compressed voice signal in time slots 2 and 5, and mobile station 30 will receive its compressed voice signals in time slots 3 and 6.

The 324 bits for each time slot are allocated as indicated in FIG. 3. The first 28 bits of each time slot provide synchronization between the base station and the mobile station. The next 12 bits of each time slot are assigned to the slow associated control channel (SACCH). The next 130 bits of each time slot are for the compressed voice data. The next 12 bits of each time slot are assigned to the coded digital verification color code (CDVCC). The next 130 bits of each time slot are for the compress voice data. The next bit of each time slot is reserved. The last 11 bits of each time slot are assigned to the coded digital control channel locator (CDL). The signals transmitted by the allocated bits of each time slot are defined by TIA Standard IS-136. The bits of each time slot, which are not used for voice data, are generated by the cell control circuit 20, are connected to the multiplexer 62 via line 70, and are inserted into each time slot by the multiplexer 62 in the proper sequence to produce the multiplexed signal on line 64.

When a first mobile station, such as mobile station 30 approaches boundary 80 of the cell 12, the quality of the voice signal received by that mobile station 30 may deteriorate. In connection with the present invention, the cell control circuit 20 of the base station 16 identifies the mobile station 30 as being in need of voice quality improvement, selects an idle transmission resource (preferably an adjacent idle time slot), sends the identity of the selected transmission resource to the mobile station 30, and provides signal enhancing data on that selected transmission resource.

When a preempting request for service is received for or from a second mobile station, such as mobile station 26, the cell control circuit 20 terminates transmission of signal enhancing data to the mobile station 30, informs the mobile station 30 of that the selected transmission resource is no longer available to it, and reassigns the selected transmission resource to the mobile station 26 for providing voice service. Alternatively, the base station may simply reassign the transmission resource being used by mobile station 30 for signal enhancing data to mobile station 26. In that case, the mobile station 30 continues decoding the information in the now reassigned resource and determines from the decoded information that the resource has been reassigned.

In connection with identifying that the mobile station 30 is in need of signal enhancing data, the cell control circuit 20 identifies the mobile station in need by monitoring a signal quality parameter on line 78. The signal quality parameter may be determined in a number of ways. For example, the signal quality parameter on line 78 may result from monitoring the bit error rate (BER) from each of the mobile stations, the signal strength of each of the mobile stations, the carrier to interference ratio, or a combination of those parameters. The cell control circuit 20 receives the signal quality parameter on line 78 for each of the mobile stations 26, 28, and 30. The BER and signal strength from each of the mobile stations are ordinarily monitored by the base station so that the base station can hand off the mobile station to a better channel of the same base station or to the next cell when the mobile station moves from one cell (such as cell 12 in FIG. 1) to the next (such as cell 14).

When the signal quality parameter on line 78 reaches a predetermined threshold level for a particular mobile station, the cell control circuit 20 identifies that mobile station as a candidate for reception of additional signal enhancing data. By monitoring the signal quality parameter, the cell control circuit 20 can identify a mobile station, such as mobile station 30, to receive signal enhancing data.

In order to insure that the method of the present invention does not alter the ordinary hand off boundaries of the TDMA cellular telephone system, the mobile station should report the BER to the base station as if the mobile station had received no signal enhancing data. This practice also insures that, when a selected transmission resource (time slot) is preempted for a new mobile station and signal enhancing data transmission is terminated, the mobile station losing the signal enhancing data will not experience unusable voice quality on a channel that was really poorer than design constraints would allow.

Having determined the need to send signal enhancing data to the mobile station 30, the cell control circuit 20 of base station 16 of cell 12 also identifies and selects an idle transmission resource for sending signal enhancing data to the mobile station. In the preferred embodiment of the present invention, the selected resource for transmitting signal enhancing data is an adjacent idle time slot on the RF channel being used by the mobile station 30. An idle time slot on another RF channel of the same base station 16 could likewise be selected. In order to identify and select an idle time slot in the same RF channel, the cell control circuit 20 monitors the analog voice (or data) inputs Vo1, Vo2, and VoN (FIG. 2). By constantly monitoring the analog voice inputs Vo1, Vo2, and VoN, the cell control circuit 20 can identify and select idle time slots for uses as a selected transmission resource. For example, if the mobile station 30 is using time slots 1 and 4 (FIG. 3), the cell control circuit will check to determine the availability of time slots 2 and 5 (mobile station 26) and 3 and 6 (mobile station 28).

In selecting an idle resource, the selected idle time slots should be first selected from the 30 kHz RF channel that is already in use in order to minimize signal interference in the TDMA cellular telephone system. For instance, if the mobile station 30 is receiving on time slots 1 and 4 of RF channel of base station 16 and if time slots 2 and 5 (mobile station 28) are idle, then these adjacent idle time slots would be preferable for sending signal enhancing data as opposed to other time slots. Alternatively, the idle time slots could be timewise separated from the time slots used for transmitting voice data to mobile stations. Timewise separation refers to non-adjacent idle time slots within the same frame and RF channel and to idle time slots in a different RF channel.

Because mobile stations also need to transmit when they are not receiving their assigned voice signal time slots, all of the enhancement data sent in the selected time slots may not be received. Thus, the forward error protection circuits 50, 52, and 54 should provide enhancing forward error protection data in discrete chunks each of which is useful for signal enhancement if only a portion of enhancing data in the selected signal enhancing time slot is received by the mobile station 30.

While adjacent idle time slots in the 30 kHz RF channel of the base station 16 in cell 12 are the preferred selected transmission resources for supplying signal enhancing data, there are other idle transmission resources that can be used for sending signal enhancing data. For example, the cell control circuit 20 in cell 12 could, through communications with the cell control circuit of base station 17 in cell 14, identify and select idle time slots in an RF channel being transmitted from the base station 17 of cell 14. Such a scheme is particularly appropriate where a mobile station, such as mobile station 30, (FIG. 1) is near the cell boundary 80 between cells 12 and 14.

Using idle time slots from another base station complicates the method of the present invention. Unless a co-channel base station 17 in cell 14 is used in conjunction with the base station of cell 12, the mobile station must retune and synchronize to the signal of other base station signal 17 in cell 14 during the time allotted between the normal received bursts. To facilitate this, the mobile station 30 does not necessarily attempt to reacquire frame synchronization every time the mobile station 30 reads information from the second base station 17. Instead, once synchronization is initially established, the mobile station 30 may employ a finely tuned oscillator to keep track of where the second base station 17 in cell 14 is currently transmitting within the frame sequence of downlink information. For this to be useful, the signal enhancing data must appear when the mobile station 30 is not receiving and decoding its normal designated time slots from the primary base station 16 in cell 12. Alternatively, the base stations themselves could be synchronized so that re-acquiring synchronization is not needed.

In order to facilitate transmission of signal enhancing data from several base stations, besides the primary base station 16, the base stations can, in coordination with each other, determine which time slots the mobile station 30 could receive by monitoring the received signal from the mobile station 30. The receive signal from the mobile station 30 usually has a known offset time difference between the transmitted and received signals in the TEMA cellular telephone system. If synchronization is not desired between base stations, the other base stations, such as base station 17, may still be able to determine, through monitoring the time offset, which time slots of its own RF channel could be used by the mobile station 30 for receiving signal enhancing data.

Having identified and selected the transmission resource (preferably time slots) for sending signal enhancing data from base station 16, the mobile station 30 must be able to receive and decode the additional signal enhancing data. In the preferred embodiment of the present invention, the cell control circuit 20 sends the identity of the selected time slot or slots to the mobile station by means of the Fast Associated Control Channel (FACCH). As define in TIA Standard IS-136, FACCH is a blank-and-burst channel used for signaling message exchange between the base station arid the mobile station. By identifying the selected time slots by means of FACCH, the mobile station 30 can begin monitoring the additional signal enhancing time slots in order to receive the signal enhancing data that is being sent by the base station 16.

Alternatively, the cell control circuit 20 may simply put a flag into the signal enhancing data and transmit the signal enhancing data in the selected time slots. The mobile station 30 that requires the signal enhancing data will scan the available transmission resources looking for the flag. Once the flag is found, the mobile station 30 will begin decoding the signal enhancing data that is identified by the flag. When the flag is removed, the mobile station 30 will stop monitoring those time slots and will begin scanning again for flagged signal enhancing data in another selected transmission resource.

Once the cell control circuit 20 has selected the transmission resource for the transmission of signal enhancing data to the identified mobile station 30, the cell control circuit 20 can generate the additional signal enhancing data in three ways. First, and preferably, the cell control circuit 20 can, via line 74, instruct the forward error protection circuits 50, 52, and 54 to increase the amount of forward error protection data. Such increase in forward error protection data reduces the transmission losses and thereby improves the quality of the received signal by the mobile station 30. Also, the cell control circuit 20 can, via line 72, instruct the vocoders 38, 40, and 42 to lower the compression ratio and thus increase the fidelity of the voice signal provided to the forward error protection circuits. Alternatively, a combination of lower compression ratio and additional forward error protection data could be used to provide the signal enhancing data for the present invention.

Figure 4:
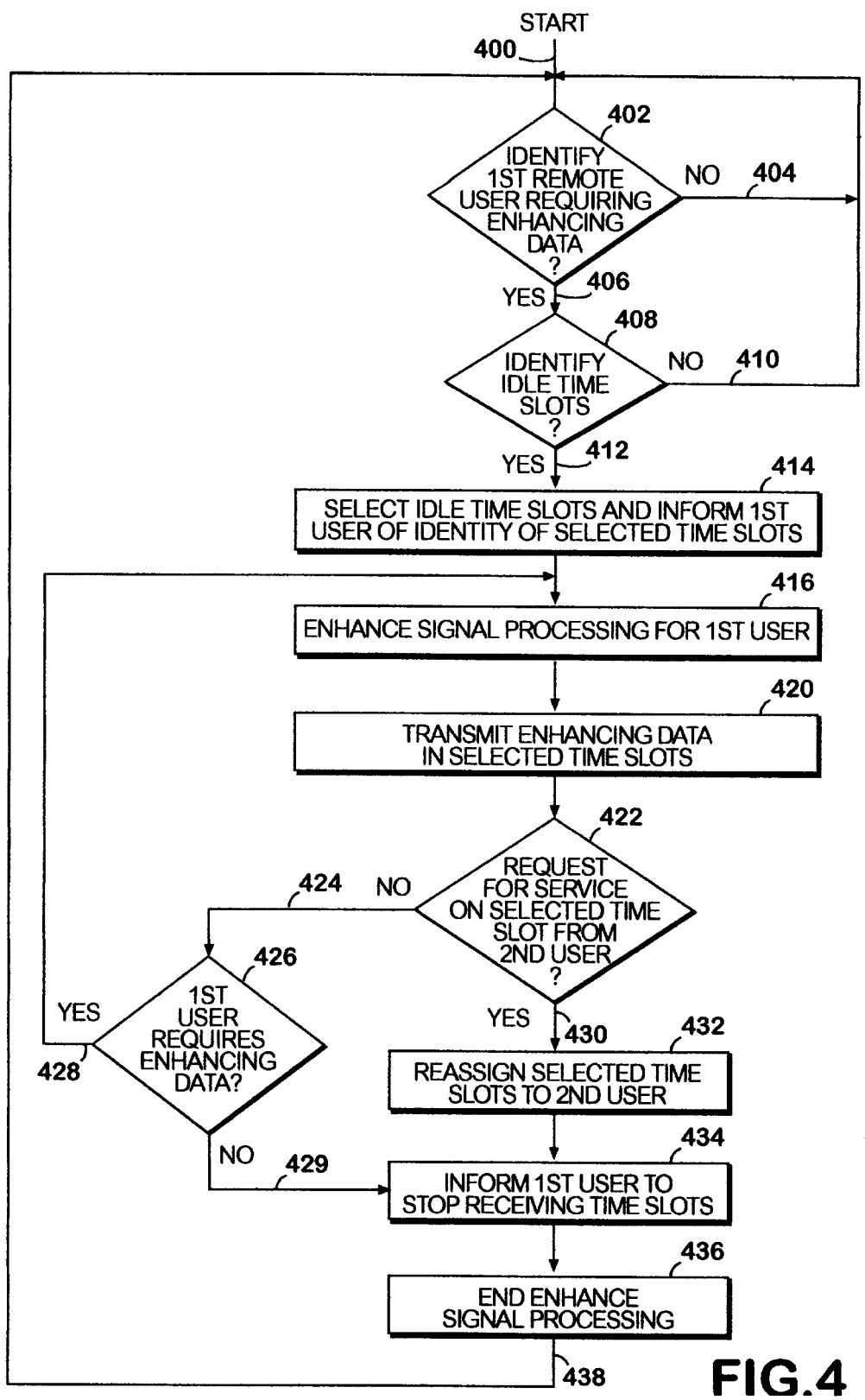
FIG. 4 is a flow diagram showing the method of the present invention implemented by the cell control circuit.

Turning to FIG. 4, there is shown a flow diagram for the method of the present invention. The method of FIG. 4 is implemented in cell control circuit 20. Cell control circuit 20 is a multipurpose digital computer which is programmed in accordance with the method of the present invention, and particularly the method illustrated in FIG. 4. The method of the present invention starts at step 400 and proceeds to step 402. At step 402 the method identifies a first remote user or mobile station that requires signal enhancing data. The cell control circuit 20 identifies first remote user requiring signal enhancing data by monitoring a signal quality parameter that may be based on the BER, the signal strength from the remote users 26, 28, and 30 (FIG. 1), the carrier to interference ratio, or a combination thereof. If there are no remote users requiring signaling enhancing data, the method follows the "no" branch 404 and returns to start 400. If on the other hand, the cell control circuit 20 identifies a first remote user requiring signal enhancing data, the method follows the "yes" branch 406 and proceeds to step 408.

At step 408, the cell control circuit 20 identities an idle time slot or slots for use in transmitting signal enhancing data. If no idle time slot is available, the method follows the "no" branch 410 and returns to start 400. If on the other hand, cell control circuit 20 finds idle time slots available, the method follows the "yes" branch 412 to step 414.

At step 414, the cell control circuit 20 selects the idle time slot or slots. In addition, the cell control circuit 20 can inform the remote user of the identity of the selected time slots on which the signal enhancing data will be sent.

At step 416, the cell control circuit 20 instructs either the vocoders or the forward error protection circuits to provide signal enhancing data to be sent to the first remote user. The method then proceeds to step 420.

At step 420, the cell control circuit 20 instructs the multiplexer to begin inserting the additional signal enhancing data into the selected time slots for transmission to the first remote user. After step 420, the method proceeds to step 422.

At step 422, the cell control circuit 20 identifies a request for service to or from a second remote user. In connection with that request, the cell control circuit 20 determines whether the selected time slots being used to transmit signal enhancing data are now required for the second remote user. If not, the method follows the "no" branch 424 and proceeds to step 426.

At step 426, the cell control circuit 20 checks to determine if the first remote user still requires signal enhancing data. If first remote user still requires signal enhancing data, the method follows "yes" branch 428 and returns to step 416 and continues to send signal enhancing data to the first remote user. If on the other hand, the first remote user no longer requires signal enhancing data, the method follows the "no" branch 429 to step 434.

At step 434, the cell control circuit 20 informs the first remote user that it is to stop receiving signal enhancing data on the selected time slots. The method then proceeds to step 436. At step 436, the cell control circuit instructs the vocoders and the forward error protection circuits to cease producing signal enhancing data. The method then returns to start 400 via line 438.

Alternatively, if at step 422, cell control circuit 20 determines that the second user requires the selected time slot for service, the method follows the "yes" branch 430 to step 432. At step 432, cell control circuit 20 reassigns the selected time slots to the second remote user. Upon reassignment of the selected time slots to the second remote user, the method proceeds to step 434. The cell control circuit 20 informs the first remote user that it is to stop receiving signal enhancing data on the selected time slots. The method then proceeds to step 436. At step 436, the cell control circuit instructs the vocoders and the forward error protection circuits to cease producing signal enhancing data. The method then returns to start 400 via line 438.

What is claimed is:

1. In a time division multiple access cellular telephone system including a base station and one or more remote users, wherein the base station includes a compressor for encoding an input data to produce encoded data and a forward error protection module for producing forward error protection data, a method for improving the quality of the encoded data received by a first remote user from the base station, comprising the steps of:

a. identifying the first remote user;
   b. selecting a second transmission resource; and
   c. transmitting signal enhancing data via the second transmission resource to the first remote user, while transmitting the encoded data to the first remote user via a first transmission resource, said signal enhancing data effective to improve the quality of the encoded data.

2. The method of claim 1, wherein the signal enhancing data comprises additional forward error protection data produced by the forward error protection module.

3. The method of claim 1, wherein identifying the remote user comprises monitoring a bit error rate from the remote user.

4. The method of claim 1, wherein identifying the remote user comprises monitoring signal strength from the remote user.

5. The method of claim 1, wherein identifying the remote user comprises monitoring a co-channel for interference from the remote user.

6. The method of claim 1, wherein the first remote user receives the encoded data in a first time slot in a first frame of a first channel transmitted from the base station of the time division multiple access cellular telephone system and the second transmission resource comprises a portion of a second time slot in the first frame of the first channel transmitted from the base station of the time division multiple access cellular telephone system.

7. The method of claim 6, wherein the second time slot is adjacent to the first time slot.

8. The method of claim 6, wherein the second time slot is time separated from the first time slot.

9. The method of claim 1, wherein the second transmission resource comprises a portion of a time slot in a frame of a channel transmitted from a second base station of the time division multiple access cellular telephone system.

10. The method of claim 1, wherein the base station communicates the identity of the second transmission resource to the remote user.

11. The method of claim 1, wherein the remote user searches among transmission resources to find the second transmission resource and the signal enhancing data.

12. The method of claim 1, wherein the method further includes terminating the transmission of signal enhancing data via the second transmission resource to the first remote user in response to a request for service from a second remote user which request requires use of the second transmission resource.

13. The method of claim 12, wherein the method further includes sending a terminate signal via the second transmission resource to the first remote user when the request for service requiring the second transmission resource is received from the second remote user and terminating receipt by the first remote user of the second transmission resource in response to the terminating signal.

14. The method of claim 12, wherein the method further includes sending encoded data, intended for the second remote user, via the second transmission resource to the first remote user when the request for service is received from the second remote user and terminating receipt by the first remote user of encoded data in the second transmission resource in response to decoding the encoded data meant for the second remote user.

15. The method of claim 1, wherein the first remote user transmits signal enhancing data via the second transmission resource to the base station.

16. In a time division multiple access cellular telephone system including a base station and one or more remote users, a method for improving the quality of the encoded data received by a first remote user from the base station, comprising the steps of:

a. identifying the first remote user;
   b. selecting a second transmission resource; and
   c. transmitting signal enhancing data via the second transmission resource to the first remote user, while transmitting the encoded data to the first remote user via a first transmission resource, said signal enhancing data effective to improve the quality of the encoded data; and
   d. wherein the first remote user receives the encoded data in a first time slot in a first frame of a first channel transmitted from the base station of the time division multiple access cellular telephone system and the second transmission resource comprises a portion of a second time slot in the first frame of the first channel transmitted from the base station of the time division multiple access cellular telephone system.

17. The method of claim 16, wherein the signal enhancing data comprises additional forward error protection data produced by the forward error protection module.

18. The method of claim 16, wherein identifying the remote user comprises monitoring a bit error rate from the remote user.

19. The method of claim 16, wherein identifying the remote user comprises monitoring signal strength from the remote user.

20. The method of claim 16, wherein identifying the remote user comprises monitoring the co-channel to interference from the remote user.

21. The method of claim 16, wherein the second time slot is adjacent to the first time slot.

22. The method of claim 16, wherein the second time slot is time separated from the first time slot.

23. The method of claim 16 wherein the first remote user transmits signal enhancing data via the second transmission resource to the base station.

* * * * *

UNITED STATES PATENT AND TRADEMARK OFFICE
CERTIFICATE OF CORRECTION

PATENT NO. : 6,236,855 B1
DATED : May 22, 2001
INVENTOR(S) : Mark David Austin

It is certified that error appears in the above-identified patent and that said Letters Patent is hereby corrected as shown below:

<u>Title page,</u>
Item [73], delete the following:
"[73]  Assignee:  BellSouth Intellectual Property Corporation
Atlanta, GA (US)"
and insert in its place:
-- [73]  Assignee:  BellSouth Intellectual Property Corporation
Wilmington, DE (US)

<u>Column 1,</u>
Line 41, please delete "15";

<u>Column 8,</u>
Line 24, please delete "TEMA" and insert -- TDMA --;
Line 27, please delete "define" and insert -- defined --; and
Line 39, please delete "arid" and insert -- and --.

Signed and Sealed this

Twenty-seventh Day of May, 2003

JAMES E. ROGAN
*Director of the United States Patent and Trademark Office*